March 28, 1933.    O. H. ANDERSON    1,903,155
LICENSE PLATE
Filed Oct. 8, 1932
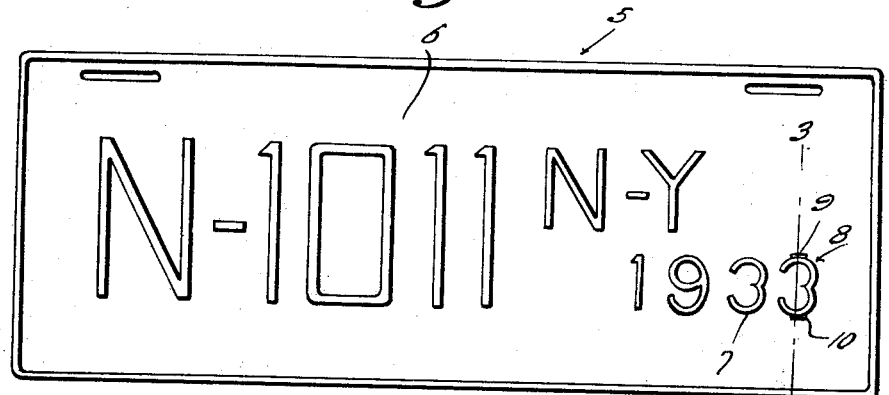
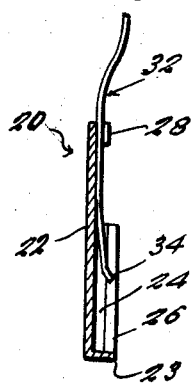
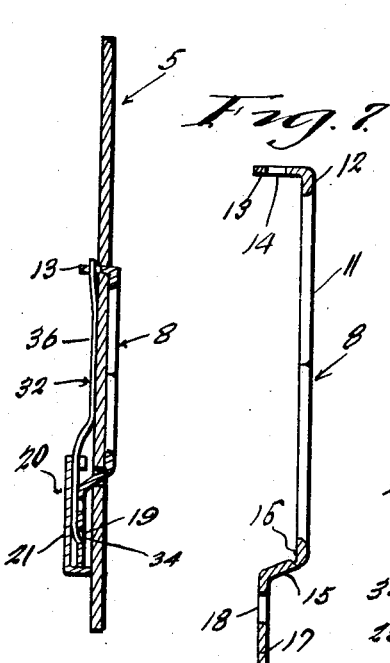
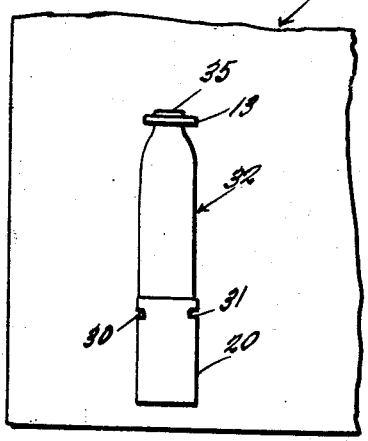
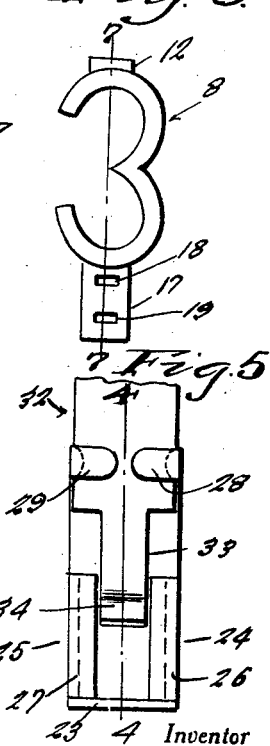
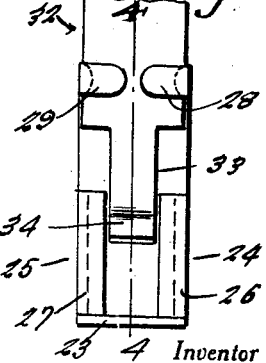
Inventor
O. H. Anderson
By Clarence A. O'Brien
Attorney Patented Mar. 28, 1933

1,903,155

UNITED STATES PATENT OFFICE

OLIVER H. ANDERSON, OF SUPERIOR, ARIZONA, ASSIGNOR TO SAFEWAY AUTO LICENSE SYSTEM, INC., A CORPORATION OF TENNESSEE

LICENSE PLATE

Application filed October 8, 1932. Serial No. 636,915.

My invention relates generally to license plates, and the like, and particularly to automobile and similar license plates in which are incorporated letters and figures or numbers, indicating the current year and other information, and more particularly to license plates as described above wherein certain of the letters, figures or numerals are made removable and replaceable, so as to avoid the necessity and expense of changing the entire plate at the end of the term for which the license has been granted.

It is an important object of my invention to provide means for changing and replacing numerals, figures and other marks on license plates and the like, whereby they are installed so as to be removable only by fracture and defacement thereof.

It is also an important object of my invention to provide means as stated above, wherein a seal is utilized for connecting parts which must be separated in order to remove or replace the same, so that mutilation or defacement of some of the parts is required for the removal thereof, so as to protect against unauthorized use of the numerals and figures and other marks.

It is also an important object of my invention to provide means for attaching such numerals, figures and marks to the license plate in a secure and non-rattling manner.

Other objects and advantages of my invention will be apparent from a reading of the following description in connection with the drawing wherein for purposes of illustration I have shown a preferred embodiment of the invention.

In the drawing:

Figure 1 is a front view of a license plate incorporating the features of the invention.

Figure 2 is a back view of a portion of the license plate shown in Figure 1 indicating the arrangement of the number securing means.

Figure 3 is a transverse vertical sectional view taken through Figure 1 approximately on the line 3—3.

Figure 4 is a view similar to Figure 3 of the sealing means per se, taken approximately on the line 4—4 of Figure 5.

Figure 5 is a front view of the sealing means.

Figure 6 is a front view of one of the numbers.

Figure 7 is a transverse vertical sectional view through Figure 6 approximately on the line 7—7.

Referring in detail to the drawing wherein like numerals refer to like parts throughout the same, the numeral 5 refers generally to a license plate form having the numerals or other characters 6 formed in the face thereof, and the year designating numbers 7. One of the year numbers, that generally referred to by the numeral 8 is, according to the principles of my invention constructed so as to be removable for replacement at the end of the period to which the year designating numbers relates. By providing the last of the year numbers changeable and replaceable, a considerable cost is saved the municipality, since the necessity to provide yearly for the replacement of the entire license plate is eliminated and reduced to the much less expense of providing for the replacing numbers 8. These replaceable numbers may be made luminous or of other high visibility character so as to increase their prominence and visibility especially at night so as to reduce the difficulty experienced by policemen and other public officers in distinguishing the nature and meaning of the characters on license plates. By providing that the replacing numbers 8 of non-detachable once installed, except by breaking or defacing the same, the unlawful use thereof is effectively prevented.

In accordance with my invention, the place where the last number of the year designation 7 would ordinarily be placed is left blank. Above and below this space there are provided slots 9 and 10 respectively to receive portions on the number 8. The number 8 comprises a plate 11 formed into the contour of the number which it is to represent. At the top of the number plate 11 is a tab 12 which has a right angularly directed portion 13 provided with a transversely elongated slot 14. Depending from the lower part of the number plate 11 is an angularly directed tab 15 which is joined to the number plate 11 by a weakened portion 16 the purpose of which will subsequently appear herein. Depending from the angularly directed portion 15 is a vertical portion 16 which is provided with vertically spaced transversely elongated slots 18 and 19 respectively.

As seen in Figure 3, the right angularly directed portion 13 is adapted to pass through the upper slot 9 in the license plate, and the angularly directed tab 15 is adapted to pass through the lower slot 10 in the license plate. In passing these portions of the number 8 into the slots 9 and 10, the lower portion 16 is first passed through the lower slot 10 followed by the angularly directed portion 15. When the portion 15 approaches its final position, the right angularly directed upper tab 13 may be passed through the upper slot 9 in the license plate.

Means for preventing the displacement of the tabs 13 and 15 from the openings in the license plate, and for sealing the number 8 against removal and for requiring that the number 8 be mutilated or defaced to enable withdrawal therefrom comprises the sealing member generally designated 20. This comprises a casing 21 which is composed of the back wall 22 the bottom 23, the sides 24 and 25 and the lips 26 and 27. It will be observed that the back plate 22 extends considerably above the lips 26 and 27. The upper part of the back has projecting from the sides thereof double bent tabs 28 and 29 which are produced by punching out portions 30 and 31 of the back plate 22.

Means for connecting the sealing member 20 with the license plate and with the member 8 and for connecting them in non-removable manner, comprises the bowed spring 32 which has the reduced lower portion 33 which has at its lower end an angularly directed portion 34. The main portion of the spring member 32 is held against the back plate by the tabs 28 and 29 as seen in the drawing, in such a manner that the reduced portion 33 depends between the inner edges of the lips 26, 27 as shown in Figure 5.

As seen in Figure 3, the member 8 having been passed into the slots 9, 10, with the upper reduced portion 35 of the spring 32 then entered in the opening 14 in the upper tab 13 of the number plate 8, and the lower member 16 in a position to be engaged by the angularly directed lower portion 34 of the reduced portion of the spring member 32, the angularly directed portion 34 will engage in one of the openings 18, 19 in the depending portion 16 of the number 8. Accompanying this is a flattening of the spring member 32 as indicated in Figure 3, which holds the casing 22 against the back of the license plate and draws the number plate 8 against the front of the license plate, and at the same time prevents vertical movement of the depending portion 17 of the number plate by virtue of the engagement of the lower portion of the spring member in one of the openings 18, 19.

It will be observed that the tension of the spring member 32 is sufficient to forcibly engage the respective parts so that a non-rattling and non-shifting relation of the number plate 8 with the license plate is achieved and maintained permanently.

It will be observed that while it may be quite a simple matter to spring the upper reduced portion 35 of the spring member out of engagement with the upper tab 13 of the number plate 8, any displacement of the number plate 8 after having been assembled to the license plate in the manner described will cause bending at the weakened portion 16 and cause a fracture at this point and thereby disclose that the plate has been tampered with. In most cases, the number plate will break off at the point 16 and become useless.

It will be observed as in Figure 4 that when the spring member is in its normal position it is bowed away from the back of the license plate but when assembled with the number plate 8 is flattened out against the back of the license plate as indicated at 36 in Figure 3. The number plate 8 may be formed of some alloy material which permits of bending the same in one direction only without fracture, so that any attempt to displace the same from the position exemplified in Figure 3 will result in breaking the same at the point 16, if not at other points.

Though I have shown and described herein a preferred embodiment of the invention, it is to be definitely understood that I do not desire to limit the application of the invention thereto, and any change or changes may be made in material and structure and arrangement of parts within the spirit of the invention and the scope of the subjoined claims.

Having thus described my invention, what I claim as new is:

1. A license plate or the like comprising a plate having characters thereon, openings in the plate adjacent one or more of the characters, a character plate having portions receivable through the openings so as to position the character plate in relation to the other characters, and spring means engaged with the back of the plate and having portions offset away from the back of the plate for engaging the portions of the character plate which are extended through the openings, for holding the character plate in place.

2. A license plate or the like comprising a plate having characters thereon, openings in the plate adjacent one or more of the characters, a character plate having portions receivable through the openings so as to position the character plate in relation to the other characters, and spring means engaged with the back of the plate for engaging the portions of the character plate which are extended through the openings, for holding the character plate in place, and seal means non-removably connecting the character plate and the spring means.

3. A license plate or the like comprising a plate having characters thereon, openings in the plate adjacent one or more of the characters, a character plate having portions receivable through the openings so as to position the character plate in relation to the other characters, and spring means engaged with the back of the plate for engaging the portions of the character plate which are extended through the openings, for holding the character plate in place, and seal means non-removably connecting the character plate and the spring means, said seal means being located at the back of the plate.

4. In combination, a body having openings therethrough, a designation plate for attachment to the body, portions on the designation plate for passing through openings in the body, and means engaged with the back of the body and with the portions of the designation plate for securing the same in position, and seal means connecting said means and the designation plate for non-removably assembling the same.

5. A license plate comprising a plate having a pair of openings therein, a number plate having a pair of tabs thereon, each tab having an opening therein, and being receivable through one of the openings in the plate, and spring means engageable with the back of the plate and engageable with the openings in the tabs, and means carried by the spring means for engaging the back of the license plate and confining said spring means engaged with the aperture of one of the tabs so that movement of separation of the spring means from engagement with the opening in the last mentioned tab is positively prevented, and removal of the number plate rendered impossible without mutilating the same.

6. A body having openings therethrough, a designation plate for connection to one side of the body, portions on the plate passed through the openings, one of said portions having single opening means and the other a plurality of opening means, and spring means engaged with the other side of the body and with the single opening means and with a selected one of the plurality of opening means for non-removably connecting the designation plate to the body.

7. A body having openings therethrough, a designation plate for connection to one side of the body, portions on the plate passed through the openings, one of said portions having single opening means and the other a plurality of opening means, and spring means engaged with the other side of the body and with the single opening means and with a selected one of the plurality of opening means for non-removably connecting the designation plate to the body, said other portion of the designation plate having an extension thereon containing said plurality of opening means.

8. A body having openings therethrough, a designation plate for connection to one side of the body, portions on the plate passed through the opening, one of said portions having single opening means and the other a plurality of opening means, and spring means engaged with the other side of the body and with the single opening means and with a selected one of the plurality of opening means for non-removably connecting the designation plate to the body, said other portion of the designation plate having an extension thereon containing said plurality of opening means, said extension lying in a plane generally parallel to the designation plate.

9. A body having openings therethrough, a designation plate for connection to one side of the body, portions on the plate passed through the opening, one of said portions having single opening means and the other a plurality of opening means, and spring means engaged with the other side of the body and with the single opening means and with a selected one of the plurality of opening means for non-removably connecting the designation plate to the body, said other portion of the designation plate having an extension thereon containing said plurality of opening means, said extension lying in a plane generally parallel to the designation plate, and spaced from the back of the body.

10. A license plate or the like comprising a plate having characters thereon, openings in the plate adjacent one or more of the characters, a character plate having portions receivable through the openings so as to position the character plate in relation to the other characters, and spring means engaged with the back of the plate for engaging the portions of the character plate which are extended through the openings, for holding the character plate in place, and seal means non-removably connecting the character plate and the spring means, said seal means comprising casing means receiving a portion of the spring means and a portion of the designation plate for holding them engaged with each other.

In testimony whereof I affix my signature.

OLIVER H. ANDERSON.